Dec. 29, 1936.　　　　J. J. SHIVELY　　　　2,065,620
MULTISPEED POWER TRANSMITTING DEVICE
Filed May 9, 1934　　　5 Sheets-Sheet 1
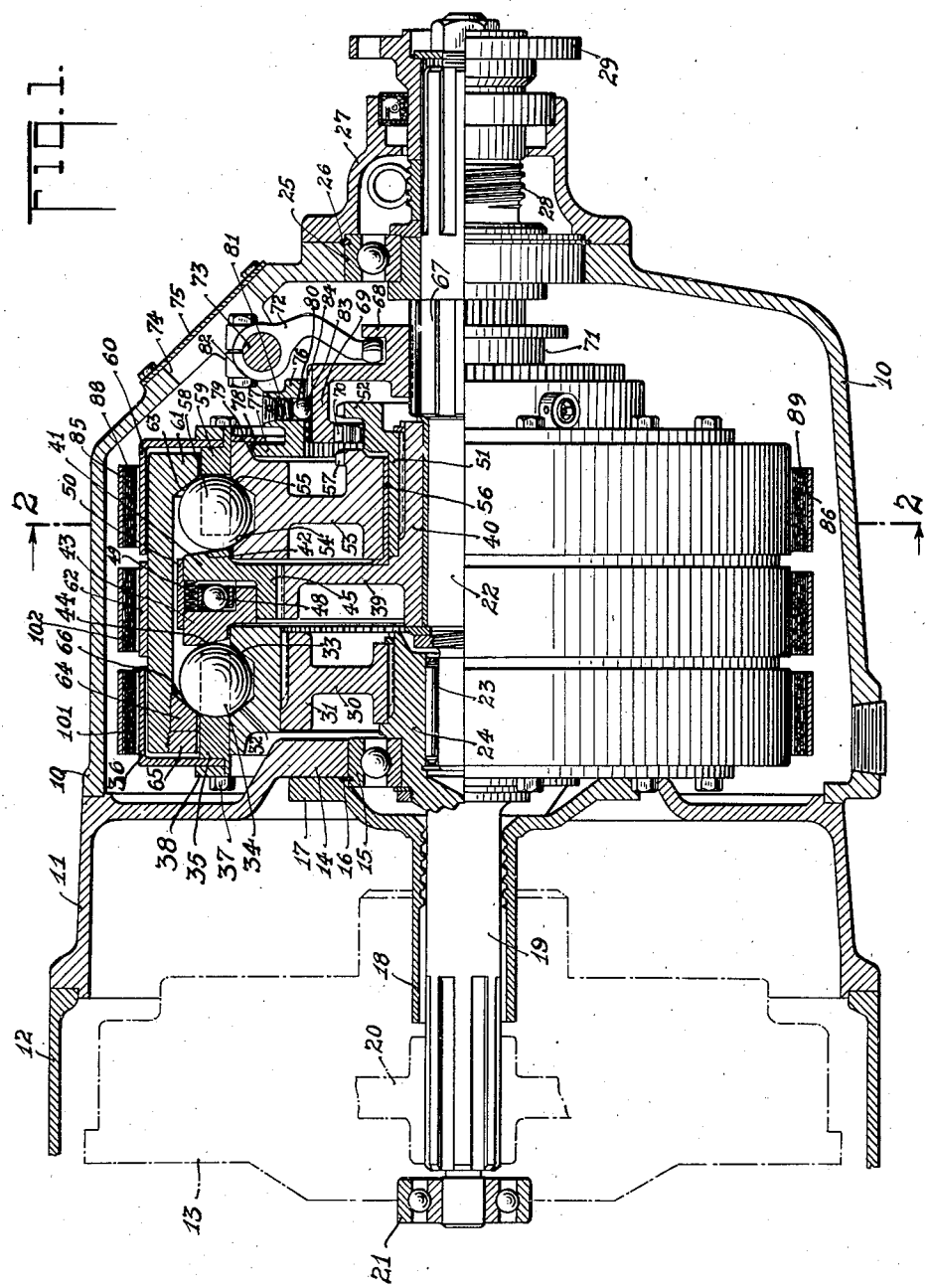
INVENTOR
JOHN J. SHIVELY
BY
ATTORNEY

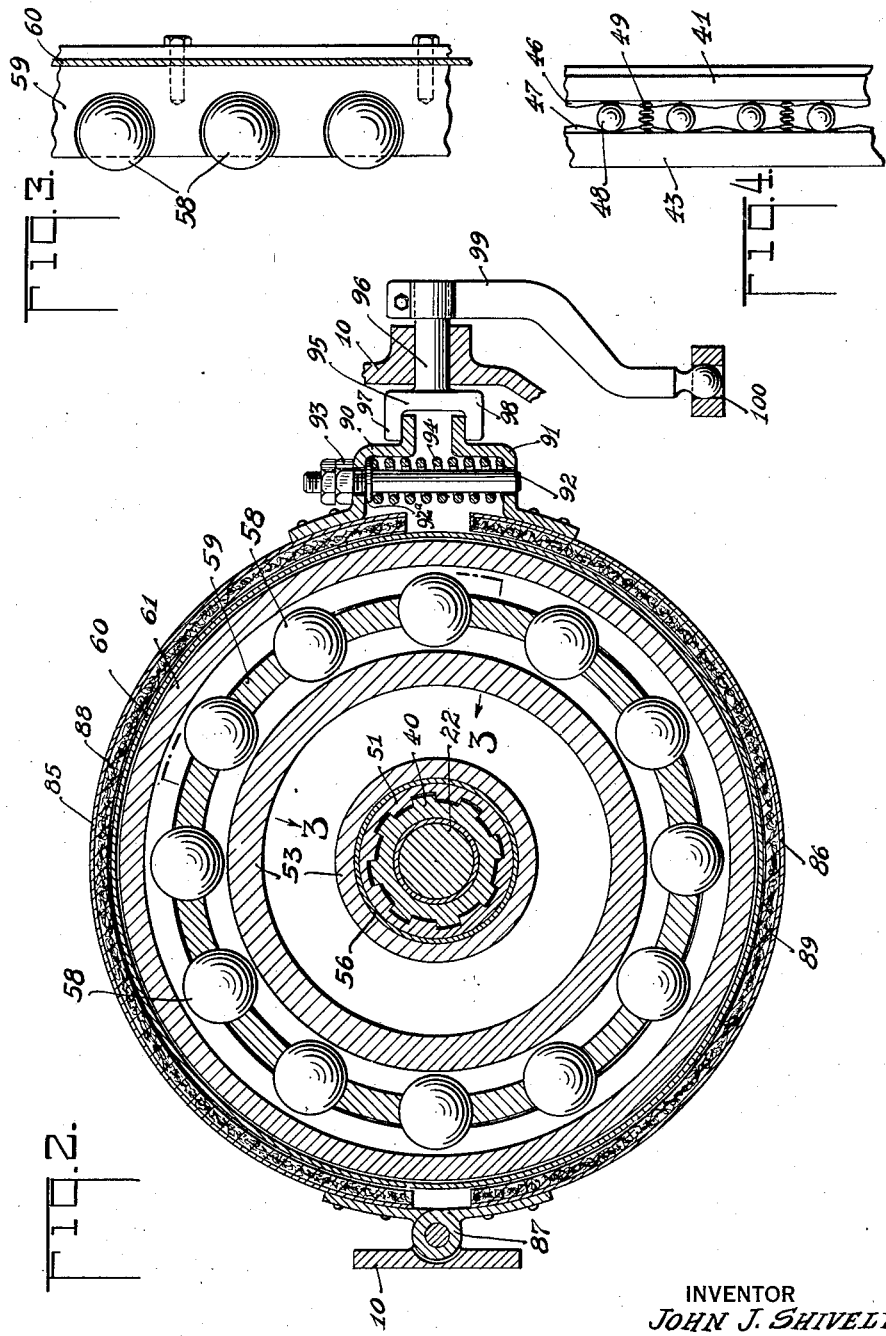

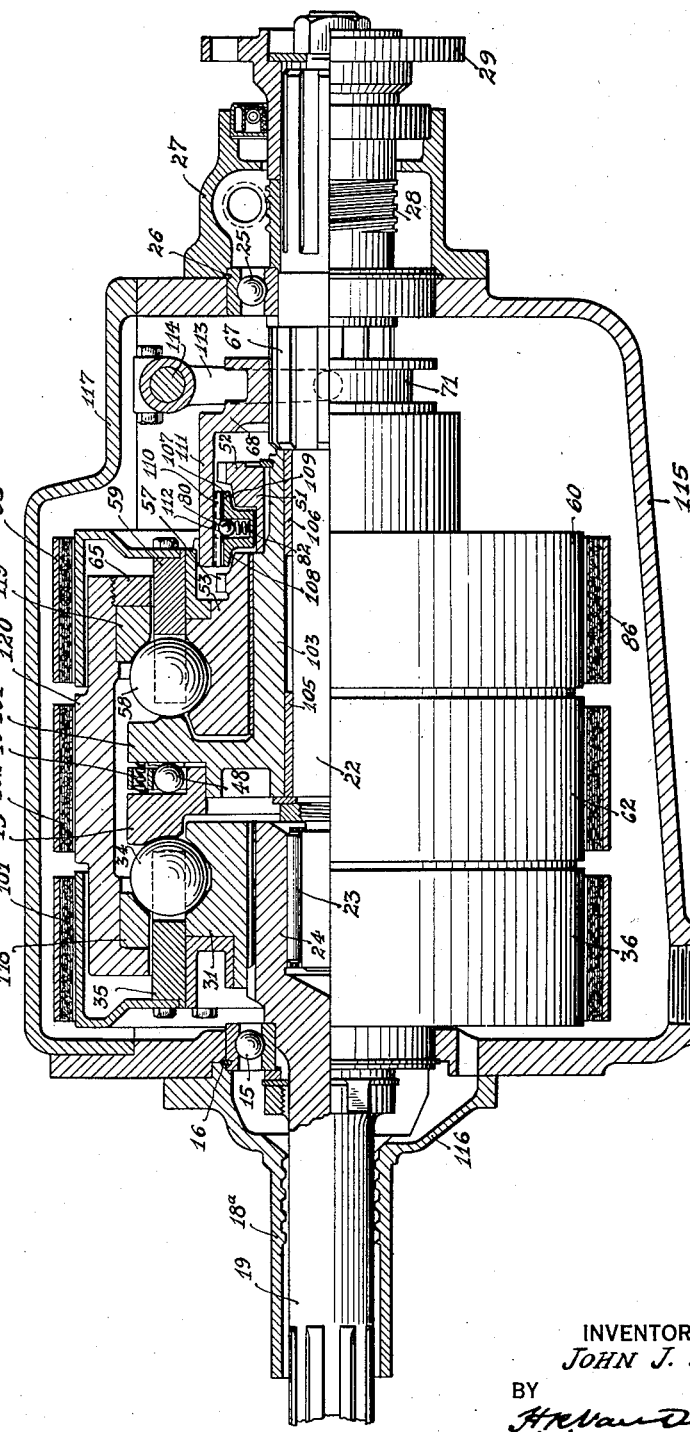

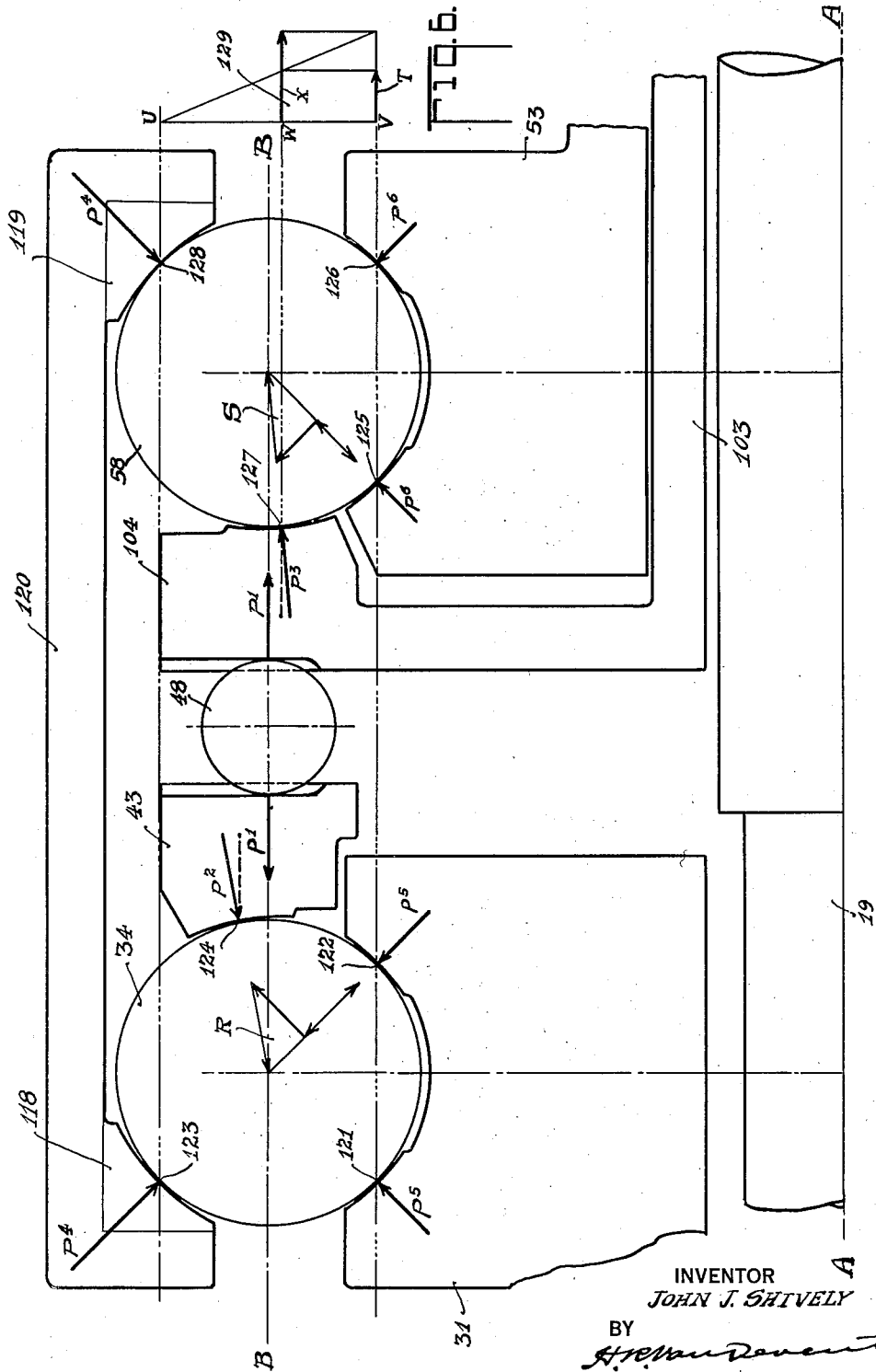

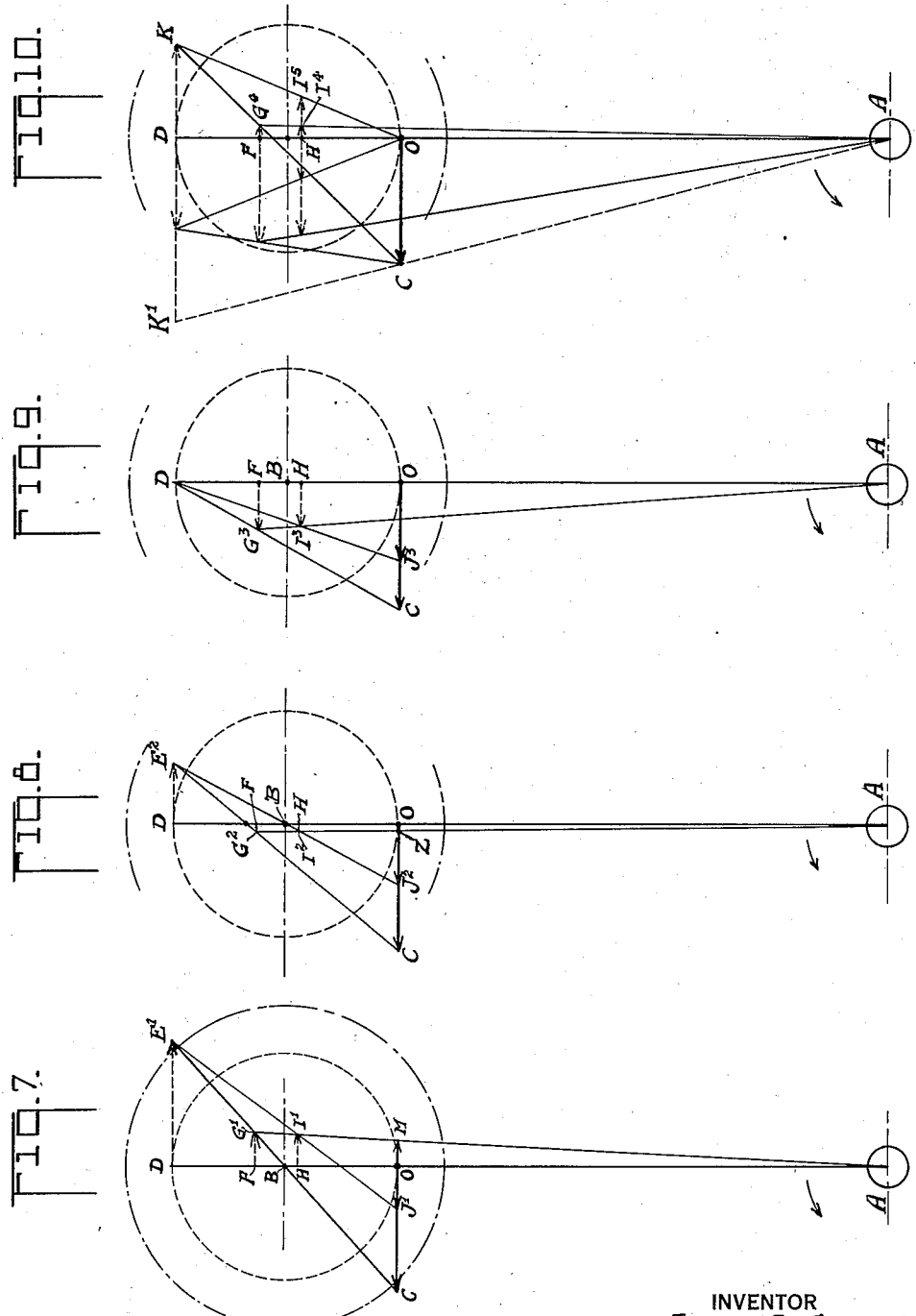

Patented Dec. 29, 1936

2,065,620

UNITED STATES PATENT OFFICE 2,065,620

MULTISPEED POWER TRANSMITTING DEVICE

John J. Shively, Bronxville, N. Y.

Application May 9, 1934, Serial No. 724,667

6 Claims. (Cl. 74—263)

This invention relates to improvements in multispeed power transmitting devices.

A power transmitting device employing two rows of rolling frictional elements and cooperating races operative to transmit power at reduced speed when one of the race members is restrained and adapted to lock automatically when the race is released whereby the entire device revolves as a unit to give a direct drive, is described in copending application Serial No. 709,320, filed February 1, 1934.

The object of the present invention is to provide means in connection with a device of the above character whereby a number of different additional set speed ratios may be secured therefrom.

A further object is the inclusion of a reverse drive in the above number of ratios.

A still further object is to secure the above number of speed ratios in convenient relation for use in power driven devices such as automotive vehicles.

In pursuance of the above objects, an embodiment of the invention is hereinafter described in connection with the attached drawings, in which:

Figure 1 is a longitudinal view, partly in section, of a multispeed power transmitting device suitable for use in automotive vehicles;

Figure 2 is a transverse sectional view of the same in the plane 2—2, Figure 1;

Figure 3 is a fragmental view of a ball cage and balls separated thereby on the lines 3—3, Figure 2;

Figure 4 is a fragmental developed view of the torque wedge;

Figure 5 is a view similar to Figure 1, showing an alternative form of the device;

Figure 6 is a diagrammatic analysis of the pressure relations of the device;

Figure 7 is a velocity diagram for low speed and reverse;

Figure 8 is a similar diagram for second speed;

Figure 9 is a similar diagram for third speed; and

Figure 10 is a velocity diagram illustrating the locking of the device in high or direct drive.

Referring to Figure 1, a main casing 10 is suitably secured to a forward drum shaped casing 11, which is in turn fastened to the flywheel housing 12 surrounding the flywheel and clutch unit 13 of an internal combustion engine (not shown). The forward casing 11 has an integral plate portion 14 forming the forward closure of the main casing 10 and containing a ball bearing 15 retained therein by a snap ring 16 and a plate 17 secured to 14 and having the usual cylindrical guiding extension 18 for the throwout member of clutch unit 13.

A drive shaft 19, carrying the driven member 20 of clutch 13, is piloted in the usual forward pilot bearing 21 and is journaled in the ball bearing 15 in plate portion 14. A stub or driven shaft 22 is piloted in a bearing 23 in a rear extension 24 of shaft 19, and is journaled in a rear ball bearing 25 retained in main casing 10 by snap ring 26 and a rear cap 27. The stub shaft carries a speedometer drive worm 28 and a drive coupling of any suitable type such as the flange member 29.

An annular member 30 is splined to the rear extension 24. A driving member 31, having external inclined race faces 32 and 33, is slidably splined to the annular member 30. Forward driving balls 34, engaging the race faces 32 and 33, are circumferentially spaced by a rigid cage 35, similar to cage 59, as illustrated in Figure 3. The cage 35 is rotatably guided on the driving member 31 and carries a brake drum 36 secured thereto by bolts 37 and a clamp ring 38.

An intermediate flange 39 has a bushed hub 40 rotatably guided on the stub shaft 22.

An annular member 41, having a rear angular race face 42, is slidably splined to the intermediate flange 39. A forward annular member 43, having an inclined forward race face 44 engaging the driving balls 34, is rotatably guided on a hub 45 of the annular member 41. Annular members 41 and 43 have opposed angular recesses 46 and 47 respectively in which are disposed rolling wedging elements such as balls 48, as shown in Figure 4. Compression springs 49, circumferentially spaced by a retainer 50 (Figure 1) urge the annular members 41 and 43 apart. The retainer 50, which also serves to radially restrain the wedging elements 48, is omitted from Figure 4 to clarify the relative positioning of the operating parts.

A sleeve 51 rearwardly carrying an externally toothed flange 52, is secured to the outside of the hub 40. A driven member 53, having external inclined race faces 54 and 55, contains a bushing 56 rotatably guided on the sleeve 51. The member 53 carries rear external teeth 57 similar to those of flange 52.

Rear driving balls 58, circumferentially spaced on race faces 54 and 55 by a cage 59, engage the rear inclined race face 42 of annular member 41. The cage 59 is rotatably guided on driven member 53 and carries a brake drum 60 secured thereto in a manner previously described in connection with drum 36.

An outer sleeve 61, carrying a brake drum 62, has a forwardly facing inclined inner race 63 engaging the rear driving balls 58, and a ring 64, secured in sleeve 61 by a threaded backing ring 65, has a rearwardly facing inclined race 66 engaging the forward driving balls 34.

The stub shaft 22 has an enlarged splined portion 67 on which is slidably mounted a shifter ring 68 having a forward extension 69 with internal teeth 70 adapted to mesh either with teeth 57 or 52 but normally spaced between them as shown in Figure 1. An external groove 71 in the shifter ring 68 is engaged by a lever 72 secured to a cross shaft 73 journaled in the casing 10. An opening 74 in casing 10, allowing assembly and inspection of the internal parts, is normally closed by a bolted plate 75.

Slidably splined to the exterior of shifter ring 68 is a braking member 76 having a flange 77 adapted to engage an inclined surface 78 in the driven member 53 when moved to the left and when moved to the right to engage a ring plate 79 secured to driven member 53. Latch balls 80, disposed in radial holes 81 in the braking member 76, are urged inward by springs 82 and normally ride in grooves 83 formed by forwardly cutting away the spline teeth 84.

Surrounding the brake drum 60 is a brake band which may be of any suitable construction such as that illustrated in Figure 2, having upper and lower sections 85 and 86 hinged to the casing 10 at 87 and provided with friction liners 88 and 89. Secured to the upper and lower sections 85 and 86 are step extensions 90 and 91 respectively. A bolt 92 secured in extension 90 by a collar 92a and nut 93, is slidable through the extension 91, acting as a guide for a coil spring 94 which normally urges the upper and lower band portions out of contact with the drum 60.

A fork or yoke 95 on the end of a shaft 96 journaled in casing 10, spans the lips 97 and 98 of the extensions 90 and 91. Secured to the shaft 96 is an exterior lever 99 adapted to be actuated by any suitable manual or power means through an eye member 100, so as to rotate the shaft 96 and yoke 95, thereby drawing the lips 97 and 98 together and clamping the friction liners 88 and 89 in contact with the drum 60. Drums 36 and 62 are also provided with brake bands 101 and 102 of the structure just described.

Referring to the modified form of the device shown in Figure 5, the driving member 31 is slidably splined directly on the rear extension 24 of shaft 19. Sleeve 51, having the rear toothed flange 52, is splined directly to an elongated hub 103 of the rear intermediate race member 104, the hub 103 having internal bushings 105 and 106 rotatably guided on the stub shaft 22. A braking member 107 having inclined front and rear angular internal faces 108 and 109 adapted to frictionally engage the driven member 53 and the sleeve member 51 respectively, is slidably meshed with the internal teeth 110 of the extension 111 of shifter ring 68. The teeth 10 are elongated so as to be capable of engagement with either 51 or 52, and notches 112 are provided to make a stop position for the latch balls 80.

The groove 71 in shifter ring 68 is engaged by a yoke 113 secured to a cross shaft 114 journaled in the main casing 115. Both front and rear ball bearings 15 and 25 are secured in the main casing 115 to which are fastened the clutch throwout guide plate 116 and the rear cap 27. Casing 115 is provided with a cover plate 117.

In this form of the device both outer race rings 118 and 119 are formed separately from the outer shell 120 and are secured therein. The middle brake drum 62 is formed integrally with the shell 120.

In explaining the speed and pressure relations of the device, reference is made to the form shown in Figure 5 as its relatively small diameter permits the corresponding diagram, Figure 6, to be enlarged for purposes of clearness. It will be understood, however, that the same type of diagram applies to either form, the only differences being those due to different proportions.

The various race surfaces in either form of the device may be concave to provide a larger area of contact between balls and races, and this construction is illustrated in Figure 5 and the corresponding diagram, Figure 6. The radius of race concavity is made slightly larger than the radius of the balls, in accordance with ball bearing practice. The speed of power transmission between balls and races is determined by the middle point of each contact area, that is the point on which the ball would roll if no pressure were applied to it, neglecting spring of the races. These points are denoted as follows in the diagram, Figure 6:

First driving balls 34 contact the driving member 31 at points 121 and 122, the outer race 118 at 123, and the forward annular or intermediate race 43 at 124. The second driving balls 58 contact the driven member 53 at 125 and 126, the rear intermediate race 104 at 127 and the outer race 119 at 128.

The operation of the device is as follows: The parts being in the relative positions shown in Figure 5, the teeth 110 of shifter ring 68 are out of mesh with both teeth 57 and toothed flange 52, the device is in neutral position. When it is desired to place the device in low forward driving ratio, the engine clutch being assumed to be disengaged, the shaft 114 is rotated clockwise by any suitable manual or power means, causing the yoke 113 to slide the shifter ring 68 to the left. Due to the latch balls 80 pressed into the notches 112 by springs 82, the braking member 108 is carried to the left until its inclined face 108 presses against the driven member 53, thereby acting as a brake on the latter to bring its speed to that of the stub shaft 22. When sufficient pressure is applied by the yoke 68 to force the balls 80 out of notches 112, the teeth 110 advance into mesh with teeth 57, thus rotatively locking driven member 53 to stub shaft 22. The drum 36 is gripped by the brake band 101 in the manner described in connection with Figure 2. The device is now in low speed drive position.

The shaft 19 being revolved, drives the driving member 31, the linear speed of the driving race points 121 and 122 in contact with balls 34 being represented by the length of line OC in the velocity diagram, Figure 7. The cage 35 being held stationary by the brake 101 gripping the drum 36, the balls 34 are restrained from traveling around the shaft center line AA and consequently rotate only around their own axes in the line BB driving the outer race contact point 123 in a reverse direction at linear speed DE'. At the same time the forward intermediate race contact point 124 is driven in reverse direction at linear speed FG'. The rotation of forward intermediate race member 43 is transmitted to the rear intermediate race member 104 by the balls 48 confined in the angular recesses 46 and 47 shown in Figure 4, the contact point 125 of 104 with balls 58 having a linear speed HI'.

The contact point 128 of outer race ring 119 on balls 58 being the same radial distance from AA as the point 123, has the same velocity DE' and tends to roll the balls 58 backward. The speed HI' of point 125 being fixed as already described, point 125 acts as a moving fulcrum for balls 58 and the points 125 and 126 on driven member 53 are driven forward at the resultant linear speed OJ'. The radial distance of driving contact points 121 and 122 and driven contact points 125 and 126 from the center line AA being the same, the rotative speeds of the driving and driven members have the same ratio as the linear speeds of their contact points. Thus the ratio of line OC to line OJ' represents the relative R. P. M. of the driving or input shaft 19 and the stub or output shaft 22.

For second speed operation the brake 101 is released and drum 60 is gripped by corresponding band halves 85 and 86, thereby stopping the cage 59 and retaining the rear balls 58 from revolving about shaft center AA. Referring to the velocity diagram, Figure 8, the linear velocity of the driving member is represented by OC as in Figure 7. The point 124 becomes the moving fulcrum for the forward balls 34, its speed being determined by the speed $HI^2$ which the point 127 receives from the rear balls 58. The outer race takes speed $DE^2$ in reverse direction, and as the cage 59 is stationary the driven member 53 is driven forward at velocity $OJ^2$ which is greater than OJ', Figure 7. The ratio OC to $OJ^2$ is thus the second speed ratio.

For third speed operation both cages are released and the outer shell 120 is stopped by the brake 102 on drum 62. Referring to Figure 9, the driving speed OC is imparted to forward balls 34 as previously noted, but the outer race contact point 123 now becomes a fixed fulcrum, causing the point 124 to be driven forward at velocity $FG^3$. Contact point 127 moves forward at velocity $HI^3$. The rear balls 58 are thereby rolled forward on the fixed outer point 128, imparting final velocity $OJ^3$ to the driven member 53. The third speed ratio is thus represented by the ratio of OC to $OJ^3$.

For direct drive operation all brakes are released. There being no restraint applied to any member between the driving and driven members 31 and 53, no torque reaction exists and no drive with a change of torque is possible between the two members. Therefore, either the two members must revolve at the same speed or the device must idle and transmit no torque whatever. The diagram, Figure 10, demonstrates in the following manner that the device cannot idle:

If the device were to idle the driven member 53 may be assumed to be stationary and the contact points 125 and 126 (Figure 6) define a stationary fulcrum for the rear balls 58. If either the outer shell 120 or the intermediate race member 104 is moving as would be necessary for idling, the other must also move due to the fact that both are in contact with the rear balls 58 which are assumed to be rolling on the stationary points 125 and 126. Assuming, therefore, that the outer race point 128 is moving backward at any velocity DK, this motion applied to the forward balls 34 at point 123 would combine with the velocity OC of the driving member to cause forward intermediate race point 124 to move backward at velocity $FG^4$. If this occurs rear intermediate race point must move backward at velocity $HI^4$. However, point 127 must also receive the backward velocity $HI^5$ due to the speed imparted to rear balls 58 by the outer shell 120. It is therefore evident that point 127 must have both velocities $HI^4$ and $HI^5$ at the same time, which is impossible without slip, and as slip is prevented as hereinafter explained, the diagram demonstrates that the outer shell 120 cannot move backward with the driven member at rest.

In a similar way, it may be shown that for the shell 120 to idle forward the contact point 127 must have two velocities at once without slip, which is also impossible. Since therefore, for idling to occur the outer race must move, and since it has been demonstrated that it can move neither forward nor backward, it is obvious that idling is impossible.

The foregoing proof demonstrates that without an applied torque reaction no two parts in the driving train can revolve about separate centers at the same time. Since the driving member is already revolving about the shaft center A, all points in the train must also revolve about A, and as no slip can occur, their angular velocities must be the same. The linear velocities of all points must therefore be in the ratio of their radii, that is, must be indicated by vectors extending from the vertical AD to the line AK'. The device therefore revolves as a unit, the driven member and driving member having the same velocity OC.

For reverse drive the brake 101 is applied in the same manner as for low ratio, but the shifter ring 68 is slid to the right, releasing teeth 53 and bringing internal teeth 110 into mesh with the teeth of flange 52. The member 53 is now free to idle and the rear intermediate member 104 is coupled to the stub shaft 22.

When power is applied to the shaft 19, moving the driving member contact points 121 and 122 at velocity OC, Figure 7, the forward intermediate race point 124 is moved backward at velocity FG' as already explained for low gear. The intermediate member 104 being locked to forward member 43 by the balls 48, is driven backward and transmits a reverse drive to the stub shaft 22. By projecting the vector FG' down the radial line G'A to point M, the vector OM is arrived at, representing the angular velocity of the driven parts referred to OC as the angular velocity of the driving parts. The reverse R. P. M. ratio is therefore the ratio of OC to OM.

In order to effect any of the drives set forth, it has been noted that slip must be prevented at all times. In all speeds, power is transmitted between the forward and rear intermediate members 43 and 104, causing a tendency for them to twist with respect to each other. This tendency is resisted by the wedge balls 48 which roll slightly between the inclined surfaces of recesses 46 and 47, wedging the latter apart. A longitudinal pressure P', Figure 6, is thus set up in both directions, exerting normal pressures $P^2$ and $P^3$ on the forward and rear drive balls 34 and 58 respectively. These pressures are resisted by the outer race rings and the driving and driven members, which latter are free to float longitudinally on the sleeve 103 and splined extension 24 respectively. Due to the angularity of the various races the normal forces on the balls assume the relationship shown in the force polygons R and S, the individual pressures on the outer race being indicated by the vectors $P^4$, those on the driving member by P⁵ and those on the driven member by P⁶.

The relationship between the tangential or driving force X at point 127 and tangential force T at points 125 and 126 for any given speed ratio may be formed by a force diagram, the numeral 129 indicating such a diagram for third speed, Figure 6. As the balls 58 are rolling on point 128 as a fixed fulcrum, the forces X and T are in inverse proportion to the distances UW and UV, as shown. Furthermore, as the normal forces necessary on the balls to prevent slip are equal to the tangential forces multiplied by the coefficient of friction, assumed to be a constant, if the vector S is laid out equal in length to force vector P³, the relation of the various pressures on the balls to that necessary to carry the final torque on the driven members are in proportion to the various normal pressure vectors referred to the vector T. The actual magnitude of T can be calculated from the torque to be transmitted and the radius of the driven race, and by the above proportion the actual normal pressures at all points are thus determined. The angles of the wedging recesses 46 and 47, Figure 4, are chosen so as to make pressure P' sufficient to prevent slip at all contact points in all speeds.

The purpose of the springs 49, Figure 4, is to provide an initial frictional force on the various contact points to initiate the wedging action between balls and wedge surfaces as the power is applied.

By applying brake 101 as in Figure 8, but placing teeth 110 in mesh with toothed ring 52, Figure 5, a fifth forward speed having a very low ratio may be obtained, the ratio being represented by the ratio of OC to OZ, Figure 8.

While the device is shown in preferred form, it is not limited to the precise structure and proportions illustrated, as various modifications can be made therein without departing from the scope of the appended claims.

What is claimed is:

1. In a power transmitting device in combination, a driving member, a driven member, means including two rows of driving balls, cages for said balls, an intermediate race engaging said balls and an outer race engaging said balls to transfer power from said driving to said driven member, said driving member, said transferring means and said driven member being adapted to normally revolve as a unit, and a plurality of brakes adapted to engage said transferring means whereby a plurality of predetermined speed reductions may be effected between said driving and driven members solely by individual actuation of said brakes.

2. In a power transmitting device in combination, a driving member, a driven member, means including two rows of driving balls, cages for said balls, an intermediate race engaging said balls and an outer race engaging said balls to transfer power from said driving to said driven member, said driving member, said transferring means and said driven member being adapted to normally revolve as a unit, and a plurality of restraining means adapted to engage said transferring means whereby a plurality of predetermined speed reductions may be effected between said driving and driven members solely by individual action of said restraining means.

3. In a power transmitting device in combination, a driving race member, a driven shaft, a normally driven race member normally coupled to said driven shaft, a set of rolling members engaging said driving race, a cage angularly spacing said rolling members, a second set of rolling members engaging said driven member, a second cage angularly spacing said second rolling members, a forward intermediate race member engaging said first set of rolling members, a rear intermediate race member engaging said second set of rolling members, wedging means rotatively coupling said forward and rear intermediate race members together, an outer race member engaging said rolling members, means to individually restrain said first cage, said second cage and said outer race member from rotation whereby a plurality of forward speed reductions may be effected, means to uncouple said normally driven member from said driven shaft, and means to couple one of said intermediate race members to said driven shaft whereby a reverse drive may be effected when one of said cages is restrained from rotation.

4. In a power transmitting device in combination, a driving race member, a driven shaft, a normally driven race member normally coupled to said driven shaft, a set of rolling members engaging said driving race, a cage angularly spacing said rolling members, a second set of rolling members engaging said driven member, a second cage angularly spacing said second rolling members, a forward intermediate race member engaging said first set of rolling members on a circle of predetermined radius, a rear intermediate race member engaging said second set of rolling members on a circle of different radius from said first circle, wedging means rotatively coupling said forward and rear intermediate race members together, an outer race member engaging said rolling members, means to individually restrain said first cage, said second cage and said outer race member from rotation whereby a plurality of forward speed reductions may be effected, means to uncouple said normally driven member from said driven shaft, and means to couple one of said intermediate race members to said driven shaft whereby a reverse drive may be effected when one of said cages is restrained from rotation.

5. In a power transmitting device in combination, a driving race member, a driven shaft, a normally driven race member normally coupled to said driven shaft, a set of rolling members engaging said driving race, a cage angularly spacing said rolling members, a second set of rolling members engaging said driven member, a second cage angularly spacing said second rolling members, a forward intermediate race member engaging said first set of rolling members, a rear intermediate race member engaging said second set of rolling members, wedging means rotatively coupling said forward and rear intermediate race members together, an outer race member engaging said rolling members, means to individually restrain said first cage, said second cage and said outer race member from rotation whereby a plurality of forward speed reductions may be effected, means to uncouple said normally driven member from said driven shaft, and means to couple one of said intermediate race members to said driven shaft whereby a reverse drive may be effected when one of said cages is restrained from rotation, said wedging means being adapted to apply tractive pressure between said race members and said rolling members.

6. In a power transmitting device a driving race member, a driven race member rotatively interlocked forward and rear race members axially positioned between said driving and driven members and forming an intermediate member, a plurality of balls on said driving and driven race members and engaging said intermediate member, an outer race member engaging all of said balls, cages circumferentially spacing said balls, said members and balls being adapted to normally revolve as a unit whereby a direct drive is effected, and means to individually restrain said cages and said outer race member from rotation whereby a plurality of predetermined speed reductions may be effected.

JOHN J. SHIVELY.